US005435950A

United States Patent [19]

Sugiura et al.

[11] Patent Number: 5,435,950

[45] Date of Patent: Jul. 25, 1995

[54] METHOD FOR FORMING A NOZZLE EMPLOYED IN CONTINUOUS CASTING

[75] Inventors: Sadanobu Sugiura; Satoshi Oya, both of Anjo; Teruhisa Kawashima, Chiryuu; Koji Kawarada, Kariya, all of Japan

[73] Assignee: Toshiba Ceramics Co., Ltd., Tokyo, Japan

[21] Appl. No.: 35,930

[22] Filed: Mar. 23, 1993

[30] Foreign Application Priority Data

Mar. 24, 1992 [JP] Japan .................................. 4-096987

[51] Int. Cl.[6] .............................................. B29C 43/10

[52] U.S. Cl. ...................................... 264/67; 264/113; 264/120; 264/570

[58] Field of Search .................. 264/570, 113, 120, 67

[56] References Cited

U.S. PATENT DOCUMENTS

| | | | |
|---|---|---|---|
| 4,102,966 | 7/1978 | Duperray et al. | 264/112 |
| 4,518,398 | 5/1985 | Tanaka et al. | 264/570 |
| 4,552,710 | 11/1985 | Rigby et al. | 264/570 |
| 4,604,252 | 8/1986 | Stigler | 264/120 |
| 4,996,014 | 2/1991 | Suvanto | 264/113 |
| 5,032,335 | 7/1991 | Wilson | 264/113 |
| 5,043,123 | 8/1991 | Gormanns et al. | 264/113 |

*Primary Examiner*—Allan R. Kuhns
*Attorney, Agent, or Firm*—Finnegan, Henderson, Farabow, Garrett & Dunner

[57] ABSTRACT

A method for forming a nozzle employed in continuous casting is provided in which powder refractory materials are pressed with low hydrostatic pressure to produce preforms for an edge portion, an inner hole portion, and a powder line portion, these preforms are combined one after another in a rubber mold employing a mandrel while filling the rubber mold with a powdered refractory material for a body portion of the nozzle, and then a nozzle configuration is formed by pressing the rubber mold with a higher hydrostatic pressure than that used to produce the preforms.

9 Claims, 3 Drawing Sheets

METHOD FOR FORMING A NOZZLE EMPLOYED IN CONTINUOUS CASTING

BACKGROUND OF THE INVENTION

The present invention relates to a method for forming a nozzle employed in continuously casting for the purpose of obtaining a mold member of a submerged nozzle, a long nozzle or the like.

In general, the nozzle employed in continuously casting is constituted by employing various powdered refractory materials having different characteristics in a body portion, an edge portion, an inner hole portion, and a powder (slag line) portion in accordance with a necessary function on practical use. A mold member of a conventional nozzle of this type is obtained through a process of filling with necessary powdered refractory materials regulated in grain size one after another while employing a suitable dividing plate inside a rubber mold charging a mandrel (metal mold), and then pressing with hydrostatic pressure.

Particularly, as shown in FIG. 9, a lower end portion of a cylindrical rubber mold 21 is blocked with a disk-shaped rubber mold 22. A mandrel 23 is charged into the cylindrical rubber mold 21, so that a cylindrical mold hole is formed between the cylindrical rubber mold 21 and mandrel 23. A powdered refractory material 25 for the edge portion is filled to a predetermined height inside the cylindrical mold hole, while employing a hopper 24 mounted on an upper end portion of the cylindrical rubber mold 21. Furthermore, a powdered refractory material 26 for the body portion is filled to a predetermined height.

At the next step, a cylindrical dividing plate 27 is concentrically arranged on an outer periphery of the mandrel 23, so that a cylindrical space is formed between the dividing plate 27 and mandrel 23. A powdered refractory material 28 for the inner hole portion is filled to a predetermined height inside the cylindrical space, while employing a hopper (not shown) mounted on an upper end portion of the dividing plate 27. Furthermore, the hopper is removed, and then an upper end portion of the dividing plate 27 is blocked with a disk-shaped dividing plate 29.

At the further step, the cylindrical dividing plate 27 is concentrically arranged on an outer periphery of the mandrel 23. A powdered refractory material 28 for the inner hole portion is filled to a predetermined height inside a cylindrical space formed between the cylindrical dividing plate 27 and rubber mold 21, while employing a hopper 24 mounted on a upper end portion of the rubber mold 21. Furthermore, a powdered refractory material 30 for the powder portion is filled to a predetermined height, and then the powdered refractory material 26 is filled to the height equal to the powdered refractory material 28 for the inner hole portion.

Next, after the disk-shaped dividing plate 29 is removed and the cylindrical dividing plate 27 is released, the powdered refractory material 26 for the body portion is filled to a predetermined height. Furthermore, as shown in FIG. 10, the upper end portion of the cylindrical rubber mold 21 is blocked with the disk-shaped rubber mold 31, and then each powdered refractory materials is formed by pressing with hydrostatic pressure.

As shown in FIG. 11, each of the rubber molds 21, 22 and 31 is released after pressing with hydrostatic pressure. The mandrel 23 is further released, so that a mold member 32 for the continuous casting nozzle is formed as shown in FIG. 12. Finally, the mold member is mechanically processed into the nozzle employed in continuously casting by machining appearances and holes thereon after firing.

However, the conventional method for forming the nozzle employs the dividing plates for filling each powdered refractory material at the necessary position as described above. Therefore, there is a problem that the forming process is complicated, and the powdered refractory materials segregate at boundary portions thereof, due to releasing of the dividing plates. Moreover, there is another problem in that the powdered refractory material for each portion is incorrectly arranged.

SUMMARY OF THE INVENTION

With the above problem and difficulty accompanying the conventional method for forming a nozzle employed in continuously casting, an object of the present invention is to provide a method for forming a nozzle employed in continuously casting in which the forming process is simplified, powdered refractory materials do not segregate at boundary portions thereof. Moreover, another object of the present invention is to provide the method for forming the nozzle employed in continuously casting in which the powdered refractory material for each portion is correctly arranged at the desired position.

To achieve the above object, according to the present invention, the method for forming the nozzle employed in continuously casting is provided through a process in which necessary powdered refractory materials are pressed with lower hydrostatic pressure, thereby to form preliminary mold members or preforms for an edge portion, an inner hole portion, and a powder line portion, and then these preforms are combined one after another while filling a powdered refractory material for a body portion by employing a suitable mandrel inside a rubber mold, and a substantial mold member or nozzle configuration is formed by pressing with higher hydrostatic pressure.

According to the method of the present invention, a surface of the preform for each portion operates as a dividing member between the powdered refractory material for the body portion and the preform.

A forming pressure for a preliminary mold member or preform (lower hydrostatic pressure forming) is desired to be 250 $Kgf/cm^2$ in terms of handling efficiency and adhesiveness.

A forming pressure for a substantial mold member or nozzle configuration (higher hydrostatic pressure forming) is desired to be 1500 $Kgf/cm^2$ in terms of quality characteristic value and joint strength for each portion.

BRIEF DESCRIPTION OF THE DRAWINGS

In the accompanying drawings.

DESCRIPTION OF THE PREFERRED EMBODIMENTS

A preferred embodiment of a method for forming a nozzle employed in continuously casting according to the present invention will now be described in detail with reference to accompanying drawings.

Figure 1:
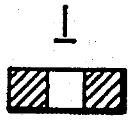
FIG. 1 is a partially broken plan view showing a preliminary mold member or preform for an edge hole portion, obtained at a previous step according to an method for forming a nozzle employed in continuously casting of the present invention.
Figure 2:
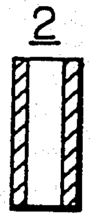
FIG. 2 is a partially broken plan view showing a preliminary mold member or preform for an inner hole portion, obtained at the previous step according to the method of the present invention.
Figure 3:
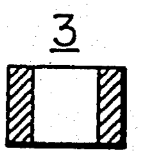
FIG. 3 is a partially broken plan view showing a preliminary mold member or preform for a powder line portion, obtained at the previous step according to the method of the present invention.

A powdered refractory material (for example, alumina-carbon-zirconia series) for an edge portion is filled inside a rubber mold charging a mandrel, and then pressed with lower hydrostatic pressure of about 250 Kgf/cm$^2$, so that a preform 1 for the edge portion is formed as shown in FIG. 1. On the other hand, a powdered refractory material (for example, alumina-carbon-zirconia series) for an inner hole portion is filled inside a rubber mold charging a mandrel, and then pressed with lower hydrostatic pressure of about 250 Kgf/cm$^2$, so that preform 2 for the inner hole portion is also formed as shown in FIG. 2. Furthermore, a powdered refractory material (for example zirconia-carbon series) for a powder line portion is filled inside a rubber mold charging a mandrel, and then pressed with lower hydrostatic pressure of 250 Kgf/cm$^2$, so that a preform 3 for the powder line portion is further formed as shown in FIG. 3. As a result, the preforms 1, 2, and 3 are obtained by operating the above forming process separately. Moreover, a surface roughing process is performed with a sandblast on joint surfaces thereof corresponding to a powdered refractory material for a body portion as described in the following.

Figure 4:
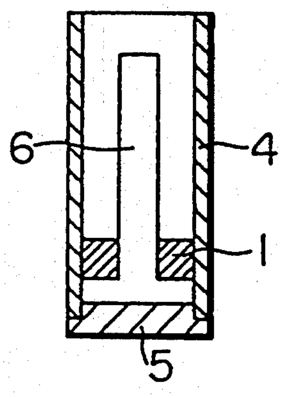
FIGS. 4 to 7 are partially broken plan views showing later steps combining the preliminary mold members or preforms one after another while filling a powdered refractory material according to the method of the present invention.
Figure 5:
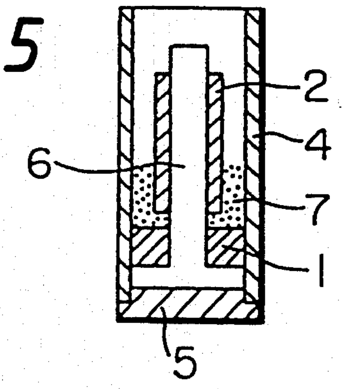

As shown in FIG. 4, a lower end portion of a cylindrical rubber mold 4 is blocked with a disk-shaped rubber mold 5. After a mandrel 6 is charged thereinto, the preforms 1 for the edge portion is received inside the rubber mold 4 while engaging with the mandrel 6 so that the surface on which the surface roughing process was preformed is an upper surface. Furthermore, a powdered refractory material 7 (for example, alumina-carbon series) for the body portion is filled to the predetermined height in a space formed between the rubber mold 4 and mandrel 6, while employing a hopper (not shown) mounted on an upper end portion of the rubber mold 4. Moreover, the preforms 2 for the inner hole portion is received inside the rubber mold 4 while engaging with the mandrel 6 and contacting to the powdered refractory material 7 for the body portion, and then the powdered refractory material 7 is filled to the predetermined height as shown in FIG. 5.

Figure 6:
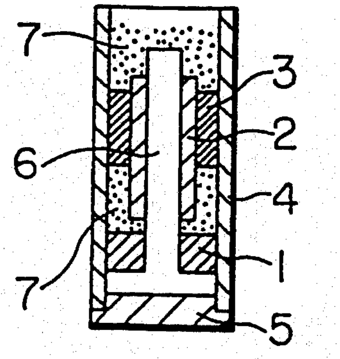
Figure 7:
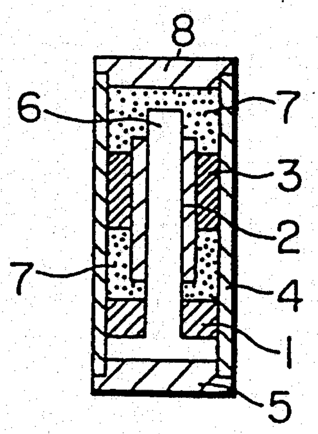

As shown in FIG. 6, the preform 3 for the powder line portion is received inside the rubber mold 4 while engaging with the preform 2 for the inner hole portion and contacting to the powdered refractory material 7. Furthermore, the powdered refractory material 7 is filled to the predetermined height. Moreover, the upper end portion of the cylindrical rubber mold 4 is blocked with a disk-shaped rubber mold 8 as shown in FIG. 7, and then pressed with higher hydrostatic pressure of about 1500 Kgf/cm$^2$.

Figure 8:
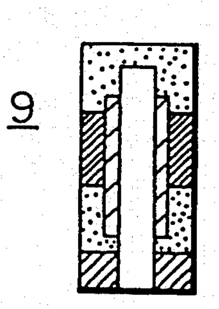
FIG. 8 is a partially broken plan view showing a substantial mold member or nozzle configuration formed after pressing with higher hydrostatic pressure according to the method of the present invention.
Figure 9:
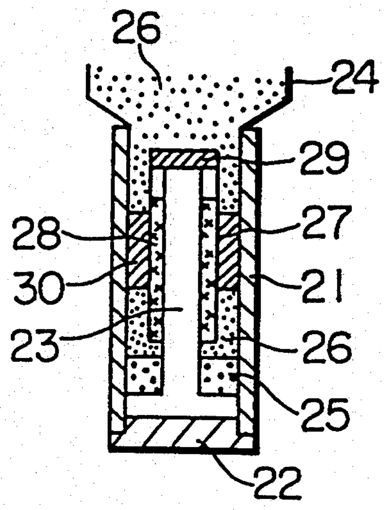
FIGS. 9 to 11 are partially broken plan views showing each step for forming a mold member according to a conventional method.
Figure 10:
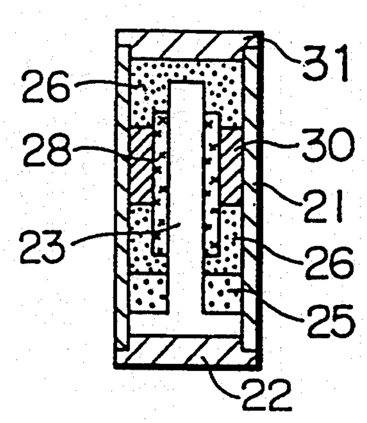
Figure 11:
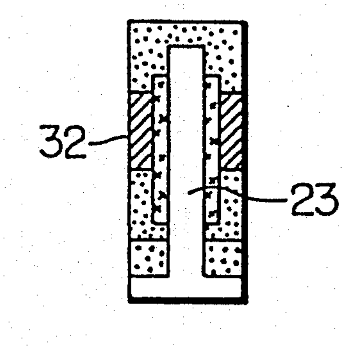
Figure 12:
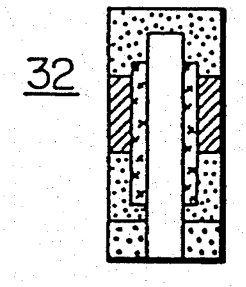
FIG. 12 is a partially broken plan view showing the mold member formed according to the conventional method.

As shown in FIG. 8, each of the rubber molds 4, 5 and 8 is released after pressing with higher hydrostatic pressure, so that a substantial mold member nozzle configuration 9 for the necessary nozzle is formed. Furthermore, the nozzle containing all necessary features for use in continuously casting is obtained by mechanically processing required appearances and holes thereon after the nozzle configuration 9 is fired. The nozzle formed as described above has a mechanical strength one and a half times as strong as that obtained by firing a mold member formed by means of the conventional method.

Although the preforms 1, 2, and 3 are formed by pressing with lower hydrostatic pressure of about 250 Kgf/cm$^2$ in the first embodiment as described above, according to second embodiment of the present invention, the preforms 1, 2, and 3 are formed by pressing with hydrostatic pressure of about 200 Kgf/cm$^2$. The nozzle formed from the mold members of the second embodiment has a mechanical strength 1.3 times as strong as that obtained by means of the conventional method.

To raise the joint strength of the preforms joining to each other and between the powdered refractory material for the body portion and the preform, a surface roughing process is desirable to perform on the joint surface thereof. The surface roughing process is achieved by roughing the joint surface after the preform is formed. As the other surface roughing process, is minute unevenness is previously provided onto a surface of the mandrel (metal mold) or the rubber mold for the preform.

Moreover, to raise the joint strength of the preforms joining to each other and between the powdered refractory material and the preform a small amount of an addition of a pitch, a boron carbide ($B_4C$) or the like is desirable to add to the boundary portion. A mortar or the other application may be applied on the joint surface thereof.

Table 1 described in the following shows the characteristics of examples 1 and 2 according to the first and second embodiments of the present invention, respectively. Table 1 further includes a comparative example of the present invention and conventional example for a comparison.

TABLE 1

| | Example 1 | Example 2 | Comparative example | Conventional example |
|---|---|---|---|---|
| Preliminary forming pressure (Kgf/cm$^2$) preform | | | | |
| 1 | 250 | 200 | 150 | Not |
| 2 | 250 | 200 | 150 | Prelimi- |
| 3 | 250 | 200 | 150 | narily forming |
| Products strength ratio | 1.5 | 1.3 | 1.1 | 1.0 |
| Segregation in grain size | None | None | None | One point |

TABLE 1-continued

| | Example 1 | Example 2 | Comparative example | Conventional example |
|---|---|---|---|---|
| Deviation of an arranged height | Maximum 2 mm | Maximum 2 mm | Maximum 3 mm | Maximum 20 mm |
| Degree of an eccentricity | None | None | None | Maximum 2 mm |

In Table 1, the comparative example needs the difficulty to handle particularly thin products due to the small joint strength of the preforms. The characteristics of each example are shown in the following manner. The number of the preform corresponds with FIGS. 1 to 3. The products strength ratio is a ratio of a compressing strength letting that of conventional products be 1.0. The segregation in grain size is compared by eyes through a X-ray fluoroscopy. The deviation of the arranged height is measured through a X-ray fluoroscopy. The degree of the eccentricity is measured through a X-ray computerized tomography. The forming pressure for the substantial mold member is 1500 Kgf/cm$^2$ in all examples.

As described above, according to the present invention, since a surface of the preform for each portion operates as a dividing member between the powdered refractory material for the body portion and preliminary mold member, the method of the present invention does not require a dividing plate as employed in the conventional method. Therefore, the method of the present invention can effectively simplify the forming process without segregating the powdered refractory materials at boundary portions thereof and producing traces. Moreover, the method of the present invention can arrange the powdered refractory material for each portion at the desired position.

What is claimed is:

1. A method for forming a nozzle employed in continuous casting, comprising the steps of:

forming a plurality of preforms by pressing a powdered refractory material with hydrostatic pressure, separately;

combining said preforms one after the other in an overall mold while filling a volume around said preforms with a powdered refractory material and employing a mandrel member inside said overall mold to define an inner hole portion of the nozzle; and forming a nozzle configuration by pressing said preforms in said overall mold with higher hydrostatic pressure than said hydrostatic pressure used in the forming step for said preforms.

2. The method of claim 1, wherein said forming step for said preforms comprises forming preforms for an edge portion, an inner hole portion, and a powder line portion of said nozzle.

3. The method of claim 1, further comprising the step of releasing said mandrel member and said overall mold from said nozzle configuration and firing and mechanically processing said nozzle configuration to achieve a final product.

4. The method of claim 1, wherein said forming step for said preforms is carried out with hydrostatic pressure of about 250 Kgf/cm$^2$.

5. The method of claim 1, wherein said forming step for said preforms is carried out with hydrostatic pressure of about 200 Kgf/cm$^2$.

6. The method of claim 1, wherein said forming step for said nozzle configuration is carried out with hydrostatic pressure of about 1500 Kgf/cm$^2$.

7. The method of claim 1, wherein at least one of said preforms is roughed on a surface which adjoins another of said preforms.

8. The method of claim 1, wherein additional material is added to a boundary portion of at least one of said preforms which adjoins another of said preforms.

9. The method of claim 1, wherein additional material is applied on a surface of at least one of said preforms which adjoins another of said preforms.

* * * * *